(12) United States Patent
Aiken et al.

(10) Patent No.: US 8,313,118 B2
(45) Date of Patent: Nov. 20, 2012

(54) CHILDREN'S RIDE-ON VEHICLE WITH PARENT STEERING ASSIST HANDLE AND STATIONARY CANOPY

(75) Inventors: Brian Aiken, East Aurora, NY (US); Auguste Silva, Orchard Park, NY (US)

(73) Assignee: Mattel, Inc., El Segundo, CA (US)

( * ) Notice: Subject to any disclaimer, the term of this patent is extended or adjusted under 35 U.S.C. 154(b) by 233 days.

(21) Appl. No.: 12/731,301

(22) Filed: Mar. 25, 2010

(65) Prior Publication Data

US 2011/0074125 A1 Mar. 31, 2011

Related U.S. Application Data

(60) Provisional application No. 61/164,554, filed on Mar. 30, 2009.

(51) Int. Cl.
*B62H 7/00* (2006.01)
(52) U.S. Cl. .................. 280/288.4; 280/47.11
(58) Field of Classification Search ............... 280/288.4, 280/47.11
See application file for complete search history.

(56) References Cited

U.S. PATENT DOCUMENTS

| | | |
|---|---|---|
| 574,235 A | 12/1896 | Bennitt |
| 575,182 A | 1/1897 | Thompson |
| 2,816,775 A | 12/1957 | Costello |
| 3,079,162 A | 2/1963 | Michaels, Jr. |
| 3,550,998 A | 12/1970 | Boudreau et al. |
| 5,028,066 A | 7/1991 | Garth |
| D355,870 S | 2/1995 | Dieudonne |
| 5,845,724 A | 12/1998 | Barrett |
| 6,120,048 A | 9/2000 | Li |
| 6,302,421 B1 | 10/2001 | Lee |
| 6,443,469 B1 * | 9/2002 | Cross et al. ............... 280/47.4 |
| 6,530,589 B1 | 3/2003 | Ma |
| 6,612,598 B2 | 9/2003 | Wu |
| 6,666,470 B2 | 12/2003 | Li |
| 6,811,172 B2 | 11/2004 | Yen |
| 6,811,173 B1 | 11/2004 | Shih |
| 6,840,527 B1 | 1/2005 | Michelau et al. |
| 6,874,802 B2 | 4/2005 | Gunter et al. |
| 7,000,935 B2 * | 2/2006 | Gunter et al. ............... 280/272 |
| 7,044,491 B2 | 5/2006 | Kettler et al. |
| 7,281,725 B1 | 10/2007 | Gunter et al. |
| D555,045 S | 11/2007 | On |
| D571,866 S * | 6/2008 | On ............... D21/435 |
| D604,777 S * | 11/2009 | On ............... D21/435 |
| D627,265 S | 11/2010 | On |
| 2003/0201621 A1 | 10/2003 | Jang |

* cited by examiner

*Primary Examiner* — Tashiana Adams
*Assistant Examiner* — Michael Stabley
(74) *Attorney, Agent, or Firm* — Edell, Shapiro & Finnan, LLC

(57) ABSTRACT

A children's ride-on vehicle includes a rotatable parent steering mechanism to steer the vehicle in a desired direction, and a canopy supported by the parent steering mechanism that remains stationary as the parent steering mechanism is rotated.

19 Claims, 9 Drawing Sheets

CHILDREN'S RIDE-ON VEHICLE WITH PARENT STEERING ASSIST HANDLE AND STATIONARY CANOPY

CROSS-REFERENCE TO RELATED APPLICATION

This application claims priority to U.S. Provisional Patent Application Ser. No. 61/164,554, entitled "Children's Ride-On Vehicle With Parent Steering Assist Handle and Stationary Canopy" filed Mar. 30, 2009, the disclosure of which is incorporated herein by reference in its entirety.

FIELD OF THE INVENTION

A children's ride-on vehicle includes a canopy supported by a parent steering mechanism. The parent steering mechanism is rotatable to steer the vehicle in a desired direction. The canopy remains substantially stationary as the parent steering mechanism is rotated.

BACKGROUND OF THE INVENTION

Ride-on vehicles for children having a child seat and pivotal front end allow children the freedom of steering the vehicle in any desired direction. Sometimes, a child is too small to control their own course or sometimes a parent wants additional control over an undesired child's riding experience. Some children's ride-on vehicles include a mechanism that enables a parent to co-control the direction of movement of the ride-on vehicles.

In particular, some ride-on vehicles include a wheeled front steering portion that can be pivoted via handlebars for turning the vehicle to the left or right, as well as a rear steering portion that is linked to the front steering portion so that steering may also be controlled by a parent or care giver. The rear steering portion is typically configured as an elongated member that extends upwardly from the rear of the ride-on vehicle, with a control handle positioned on an end thereof and at a convenient height for the parent. The elongated member is mechanically linked to a torque transfer member, which is in turn linked to the front steering portion. Rotation of the control handle causes the elongated member to rotate, which in turn rotates the front steering portion to the left or to the right via the torque transfer member.

Some conventional ride-on vehicles also include a canopy that extends over the child seat to protect and shade the child from direct sunlight, rain, etc. It is convenient to support the canopy from the elongated member on which the parent handle is located. Some conventional designs include a canopy rigidly fixed to the parent handle. However, when the parent rotates the parent handle to steer the vehicle, the elongated member and thus canopy are also rotated in such designs. When the canopy is rotated, it is no longer positioned over the child seat. Therefore, the canopy's protection is diminished or eliminated when the vehicle is turning.

There is therefore a need to provide a children's ride-on vehicle having a canopy that is conveniently mounted so that it remains substantially stationary even while the elongated member is being rotated to steer the vehicle.

SUMMARY OF THE INVENTION

The present invention is directed to a children's ride-on vehicle having a canopy supported from an elongated member that is rotatable to steer the vehicle. The canopy is supported in a substantially stationary position even when the elongated member is rotated.

A children's ride-on vehicle according to an embodiment of the present invention includes a seat, a front steering mechanism operable by a child to direct the vehicle in a desired direction, and a rear parent steering mechanism operable by a parent or care giver to co-direct the path of travel of the vehicle. The parent steering mechanism includes an elongated member extending upwardly from a rear portion of the vehicle with a control handle positioned at an elevation convenient for the parent standing behind the vehicle. The elongated member is mechanically linked to a torque transfer member, which transfers a force from a lower end of the parent steering mechanism to the front steering mechanism upon rotation of the elongated member. The front steering mechanism includes a torque conversion mechanism which converts the force transmitted by the parent steering mechanism to a force for rotating the front steering mechanism, thereby steering the vehicle in the desired direction.

In one embodiment, the ride-on vehicle includes a canopy that is supported at least partially by the elongated member of the parent steering mechanism. The canopy may be supported by a rod that extends upwardly from the rear portion and parallel to the elongated member. In one embodiment, the canopy may be supported within at least a portion of the elongated member. The elongated member partially supports the rod and thus the canopy. The rod is rigidly secured to the rear portion of the vehicle, so that the rod is maintained in a substantially stationary position. However, the elongated member is permitted to rotate in order to steer the vehicle. A distal end of the rod extends outwardly from an opening in the elongated member, with the canopy secured thereto. In this way, the canopy is retained in a relatively stationary position over the seat even when the elongated member is rotated to steer the vehicle. In other words, the elongated member rotates independently of the rod, while at the same time partially supporting the rod.

The lower end of the rod may be removably connected to the rear portion of the vehicle. Further, the lower end of the parent steering mechanism may be removably secured to the vehicle. Therefore, the parent steering mechanism including the rod and canopy can be easily and completely removed and separated from the vehicle.

BRIEF DESCRIPTION OF THE DRAWINGS

Like reference numerals have been used to identify like elements throughout this disclosure.

DETAILED DESCRIPTION OF PREFERRED EMBODIMENTS

In accordance with the present invention, a parent controlled ride-on vehicle including a parent steering mechanism that is mechanically linked to a front child steering mechanism is disclosed. The parent steering mechanism is rotatable for steering the vehicle. A canopy is mounted to the rotatable parent steering mechanism, and remains relatively stationary even when the parent steering mechanism is rotated. The term "parent" as used herein includes adults, caregivers, and any other person who can use the control feature of the vehicle.

Figure 1:
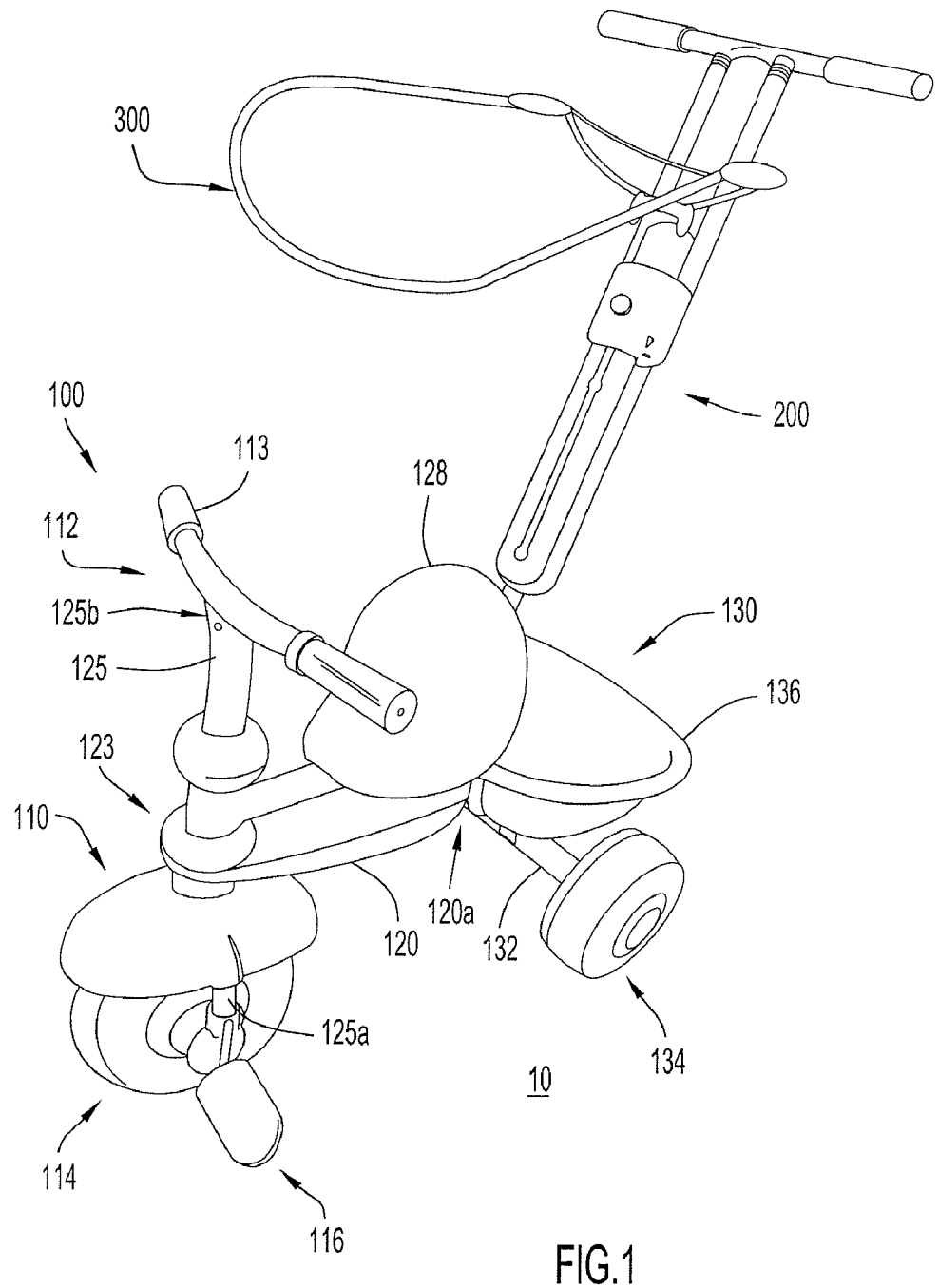
FIG. 1 illustrates a perspective view of an embodiment of a children's ride-on vehicle.

FIG. 1 illustrates an embodiment of a parent controllable ride-on vehicle 100. In this embodiment, the invention takes the general form a tricycle (i.e., two wheels in the rear and one wheel in the front). However, the invention is not so limited, and may have one or more wheels in the front and one or more wheels in the rear.

Figure 2:
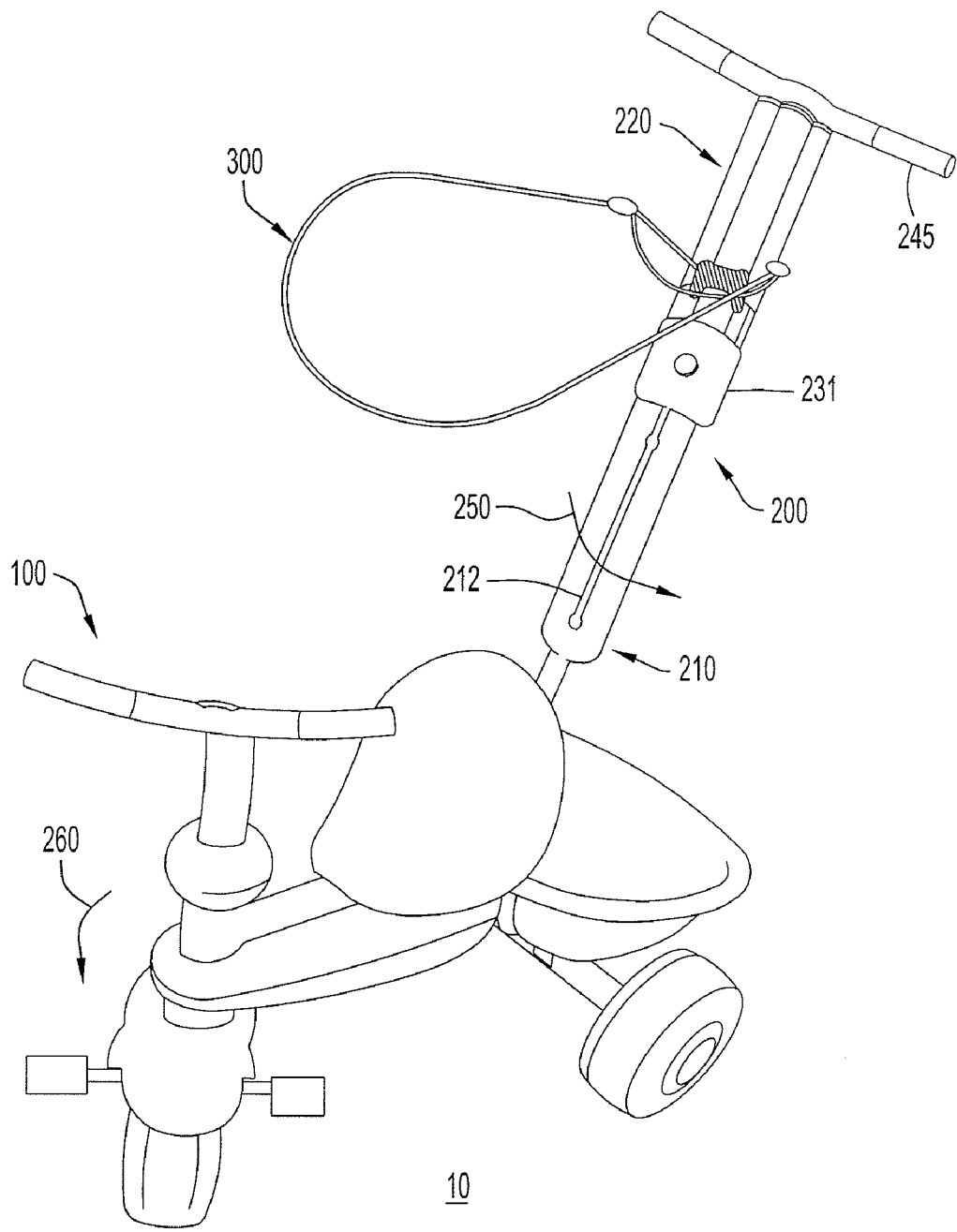
FIG. 2 illustrates a perspective view of the ride-on vehicle of FIG. 1 showing front and rear steering mechanisms of the vehicle in a left turn orientation.
Figure 3A:
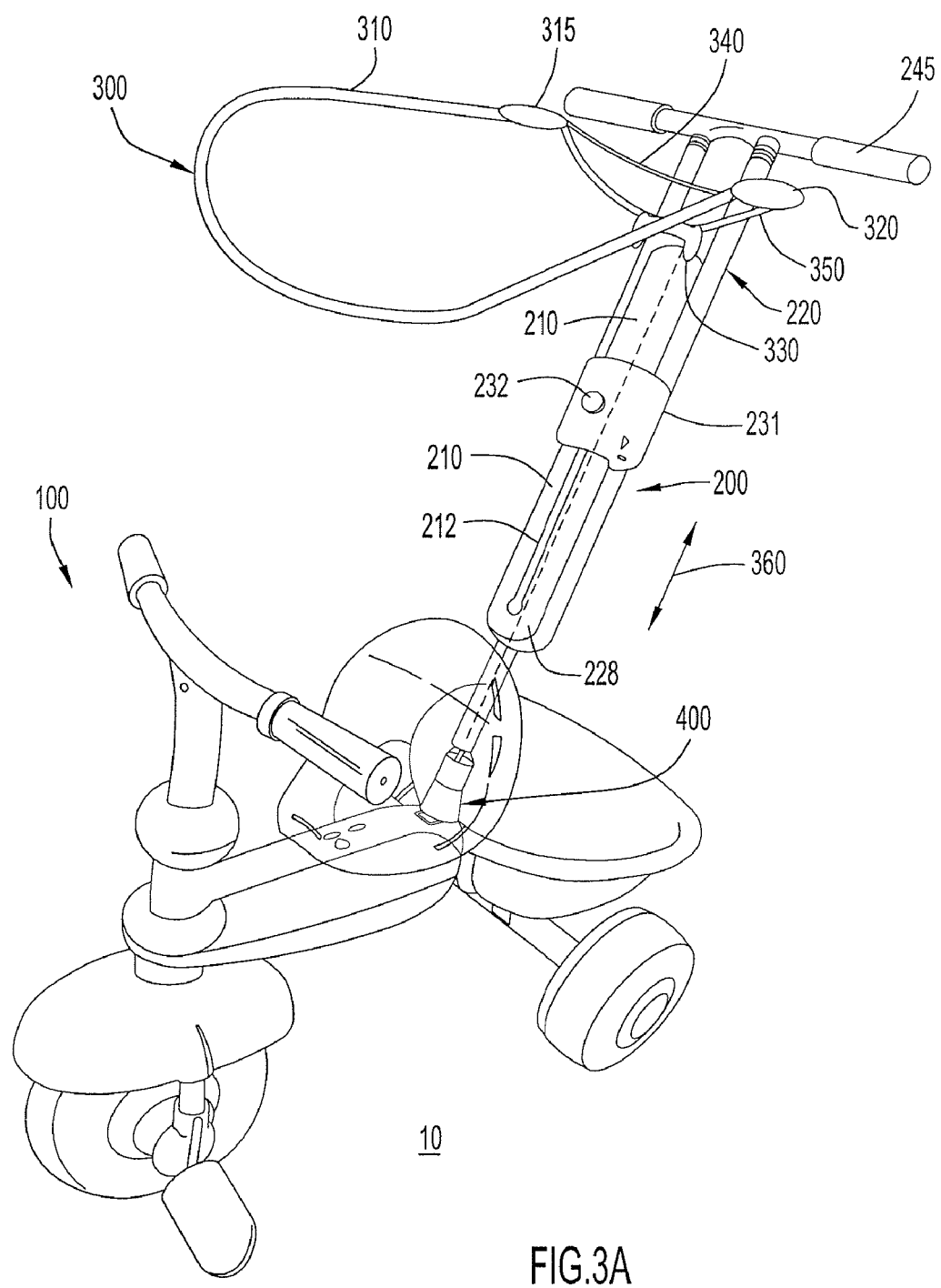
FIG. 3A illustrates a perspective view of the ride-on vehicle of FIG. 1 showing a control handle of the parent steering mechanism in a lowered position, and a support rod shown partially in phantom.

As best shown in FIGS. 1, 2 and 3A, the parent controllable ride-on vehicle 100 includes a front steering portion 110 and a rear portion 130 connected by a central member 120. The front steering portion 110 and the rear portion 130 are wheeled, and support the central member 120 above a riding surface or support surface 10. A seat portion 128 is secured to the central portion 120. The rear portion 130 is connected a rear section 120a of the central member 120, and includes a rear axle 132 and two rears wheels 134 rotatably disposed thereon. The rear portion 130 may also include a storage bin 136 supported on the rear axle 132.

The front steering portion 110 includes a steering mechanism 112 rotatably connected to a front section 123 of the central member 120. The steering mechanism 112 includes a stem 125 which extends through a correspondingly configured opening (not shown) in the front section 123 of the central member 120, so that the front section 123 forms a support within which the stem 125 is axially rotatable. A front wheel 114 is connected to a forked lower end 125a of the stem 125, as well as a vehicle propulsion mechanism 116 (e.g., pedals). Handlebars 113 are connected to an upper end 125b of the stem 125. A child operating the vehicle 100 sits on the seat portion 128, holds the handle bars 113 with the child's hands and uses the child's feet to turn the pedals 116 and thus the front wheel 114 to propel the vehicle 100.

There are several features that can be added to the parent controllable ride-on vehicle 100 to allow a parent to co-control the direction of travel of the ride-on vehicle. Extending from the rear portion 130 of the parent controllable ride-on vehicle 100 is a parent steering mechanism or parent steering member 200. The parent steering member 200 can be held and manipulated by a parent to steer the parent controllable ride-on vehicle 100, discussed in further detail below. A canopy 300 extends from the parent steering member 200. The canopy 300 extends over the seat portion 128 to protect the child. The canopy 300 remains substantially stationary relative to the seat portion 128 even when the parent steering member 200, from which it extends, is rotated by the parent in order to steer the parent controllable ride-on vehicle 100. The operation of the stationary canopy 300 in combination with the rotating parent steering member 200 will be discussed in further detail below.

FIG. 2 shows the parent controllable ride-on vehicle 100 and parent steering member 200 rotated in corresponding directions. Specifically, FIG. 2 shows the parent steering member 200 rotated to the left as indicated by rotation arrow 250 and shows the front steering portion 110 correspondingly rotated to the left as indicated by rotation arrow 260. FIG. 2 also shows a handle 245 disposed on a distal end of the parent steering member 200 and rotated in the corresponding left hand direction.

Figure 3B:
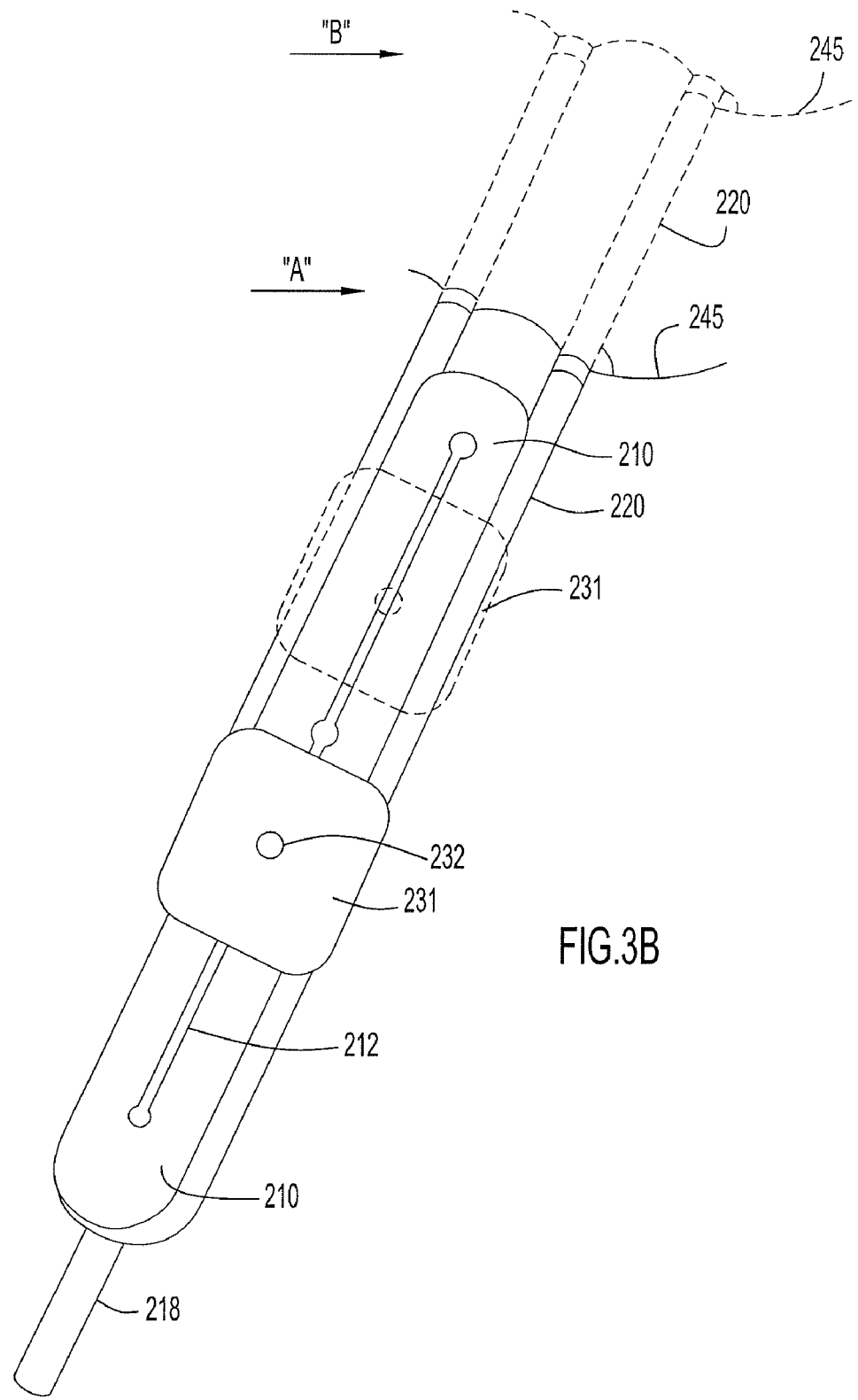
FIG. 3B illustrates a perspective view of portions of the parent steering mechanism of FIG. 1 showing the control handle in a lowered position, and showing a raised position of the control handle in phantom.

As shown in FIGS. 3A and 3B, the parent steering handle 200 may include telescopic components to adjust the distance between the handle 245 and the riding surface/support surface 10. FIG. 3A shows the handle 245 in a lowered position compared to a raised position shown in FIGS. 1 and 2. FIG. 3A also shows a directional arrow 360 which designates the direction of telescopic movement of the handle 245 of the parent steering member 200.

In one embodiment, the parent steering member 200 includes a lower member 210 that is slidably connected to an upper member 220 via a slide member 231. The slide member 231 is connected to a lower end of the upper member 220, and the handle 245 is connected to an opposite upper end of the upper member 220. The lower member 210 includes a guide slot 212 within which a lock member 232 slides. The lock member 232 may include a threaded member and associated nut or bolt (not shown). The lock member 232 may be centered on the parent steering member 200, or offset from the center. Furthermore, multiple nut/bolts may be used. The slide member 231 is slidingly received on the lower member 210 member, and locked in a selected position by tightening the lock member 232, thereby squeezing the lower member 210 between opposite sides of the slide member 231. Friction between the slide member 231 and the lower member 210 locks the upper member 220 in the selected position relative to the lower member 210.

FIG. 3B illustrates an enlarged view of portions of the parent steering member 200 of the present invention showing two telescoping positions of the upper member 220 and handle 245. Slide member 231 may be slid down the lower member 210 toward the rear portion 130 of the parent controllable ride-on vehicle 100 and releasably locked in a selected position along the guide slot 212 via the locking member 232, thereby maintaining the handle 245 in a lowered position (designed as "A"). To move the handle 245 to a raised position (designed as "B" and shown in phantom), slide member 231 is slid up the lower member 210 away from the rear portion 130 and releasably locked in another selected position along the guide slot 212. Thus, the upper member 220 slides telescopically relative to the lower member 210.

The foregoing telescopic mechanism is exemplary only. The present invention may include a different mechanism capable of providing a parent steering mechanism having an adjustable height. Moreover, the parent steering member 200 need not provide for height adjustability.

As discussed above, it is desirable to support the protective canopy 300 from the parent steering member 200. In addition, it is desirable to support the canopy 300 in a stationary manner above the seat portion 128 regardless of the direction of steering of the vehicle 100. In one embodiment, a rod 221 passes through the parent steering member 200 such that when the parent steering member 200 is rotated to steer the vehicle 100, the rod 221 remains stationary, thereby supporting the canopy in a fixed position above the seat portion 128.

Figure 4A:
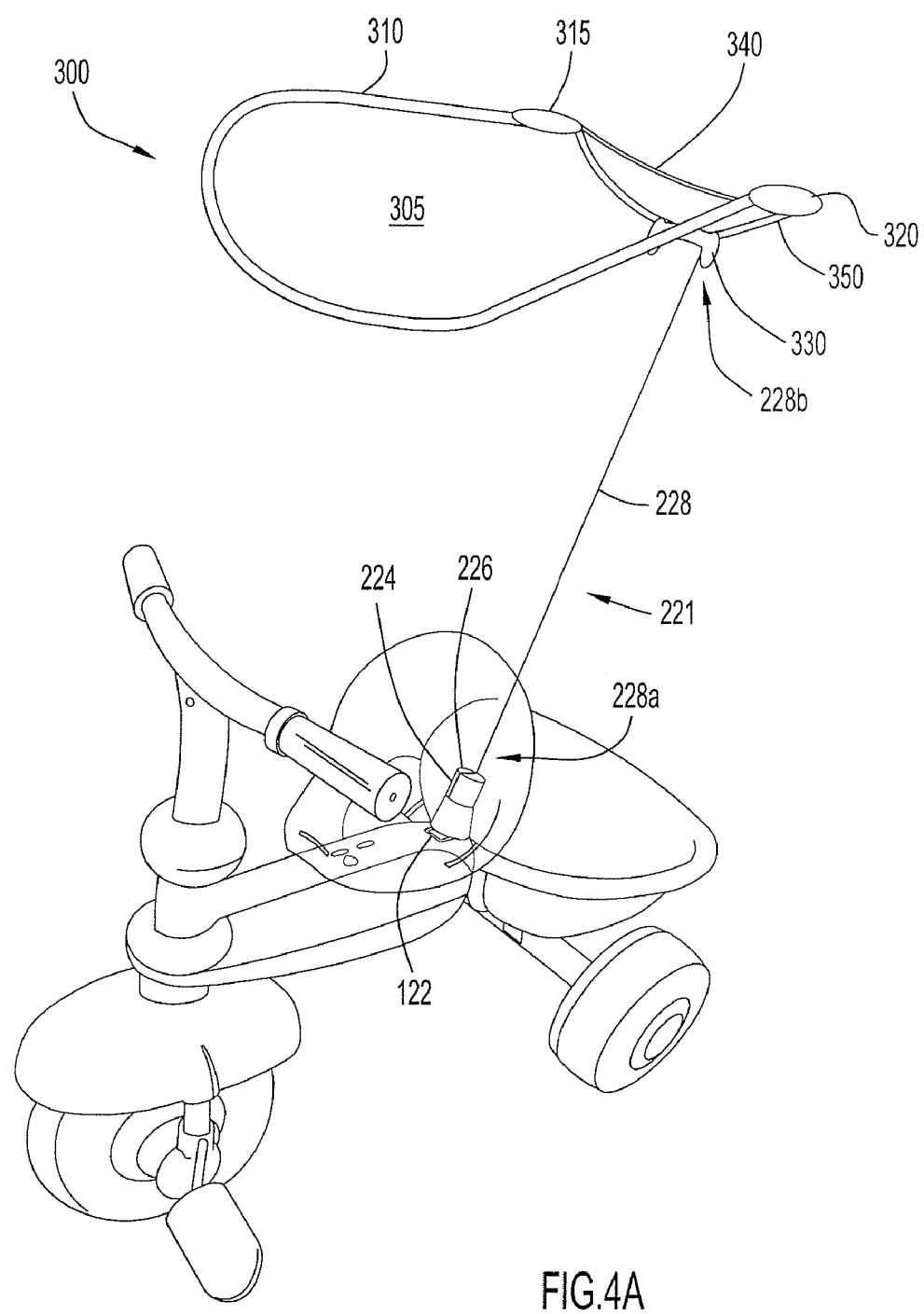
FIG. 4A illustrates portions of the ride-on vehicle of FIG. 1 showing the canopy support rod of the ride-on vehicle.
Figure 4B:
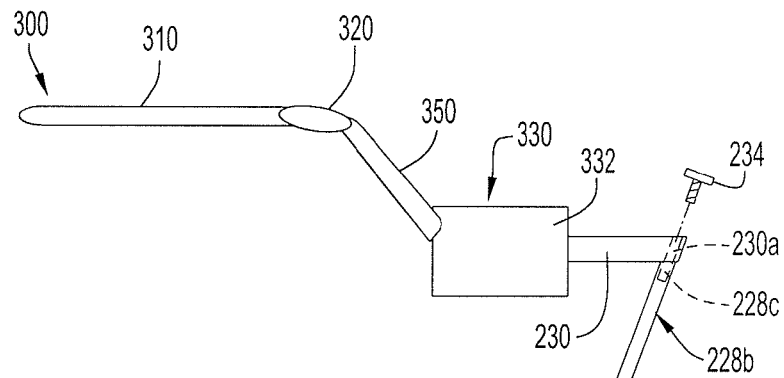
FIG. 4B illustrates a side sectional view of the canopy, support rod and canopy bracket of the ride-on vehicle of FIG. 1.

FIGS. 4A and 4B illustrate one embodiment of the canopy 300 and associated rod 221 for supporting the canopy 300. The support rod 221 includes a central portion 228 having a lower end 228a connected to the rear portion 130 of the vehicle 100. The central portion 228 of the support rod 221 extends through a hollow interior portion of the lower member 210 of the parent steering member 200, as shown in phantom in FIG. 3A. A canopy connector 330 is connected to an upper end 228b of the central portion 228. In one embodiment, the canopy connector 330 is located proximate to the top of the lower member 210, thereby reducing the space between the canopy connector 330 and the lower member 210.

The canopy connector 330 has a rod connection end 230 that extends outwardly as shown in FIG. 4B (discussed below) from the parent steering member 200. Thus, a corresponding opening or slot may be providing in an upper end of the lower member 210 through which the upper end 228b and/or the rod connection end 230 extend. For purposes of explanation, portions of the support rod 221 extending through the lower member 210 are shown in phantom in FIG. 3A. Portions of the parent steering member 200, including the lower member 210 and the upper member 220 are not shown in FIG. 4A in order to expose the structure and arrangement of the rod 221.

The lock member 232 is arranged in a position so as not to interfere with the rod 221 passing through the interior of the parent steering member 200. For example, the rod 221 may be spaced from the lock member 232, or alternatively offset relative to lock member 232 so as not to interfere with the lock member 232 during operation of the slide member 231. It should be understood that the illustrated configurations of the canopy 300 and rod 221 are exemplary only, and may vary depending on the configuration of the parent steering member 200 and the vehicle 100, and/or depending on the size, configuration and weight of the canopy 300 and/or rod 221.

Referring again to FIGS. 4A and 4B, the canopy 300 may include a cantilever member 310 for supporting a protection member 305 (FIG. 4A). The cantilever member 310 is in turn supported by a first connector 315 and a second connector 320. The first and second connectors 315, 320 are supported by a bridge member 350. In one embodiment, a lateral support 340 also extends between the first and second connectors 315, 320, providing additional support and rigidity to the cantilevered member 310.

The bridge member 350 is connected to the canopy connector 330. As noted above, the rod connection end 230 of the canopy connector 330 is connected to the upper end 228b of the rod 221. The rod connection end 230 includes an opening 230a therethrough near the distal end of the rod connection end 230. The upper end 228b includes an opening 228c formed therein that is configured to receive a connector or securing member 234 (such as a screw or bolt) that is inserted through opening 230a and into opening 228c to couple the rod connection end 230 to the upper end 228b of the rod 221. In alternative embodiments, the connection between the rod connection end 230 and the upper end 228b of the rod 221 can vary. For example, the rod connection end 230 can be formed separately from the canopy connector 330 and coupled to the canopy connector 330.

In one embodiment, the rod 221 is sufficiently strong in axial compressive strength to support the canopy 300 without deforming or bending. However, as the rod 221 may be partially supported within or along the parent steering member 200, the axial compressive strength of the rod 221 is bolstered by the parent steering member 200, thereby minimizing if not eliminating the possibility of the rod deforming or bending. This additional support may be advantageous if variable and sudden forces are exerted upon the canopy 300, such as from strong wind or rain.

The lower end 228a of the central portion 228 of the rod 221 may be relatively linear and connected directed to the rear portion 130 of the vehicle 100. Alternatively, the rod 221 may include sections extending outwardly and angularly relative to the central portion 228. The exemplary configuration of the rod 221 shown in FIG. 4B includes a generally Z-shaped lower portion having rod sections 224 and 226 extending outwardly from the lower end 228a and oriented at angles with respect to each other. Rod section 226 extends between and interconnects rod section 224 and the lower end 228a. Rod section 224 extends downwardly away from rod section 226. The central portion 228 remains stationary even when the parent steering member 200 is rotated. As such, the canopy connector 330 and canopy 300 remain substantially stationary even when the parent steering member 200 is rotated.

As noted above, the rod 221 need not be located within the parent steering member 200. For example, the rod 221 may be supported on the outside of the parent steering portion 200, parallel to the longitudinal axis of rotation so that the parent steering member 200 may rotate while the rod 221 remains stationary.

Figure 4C:
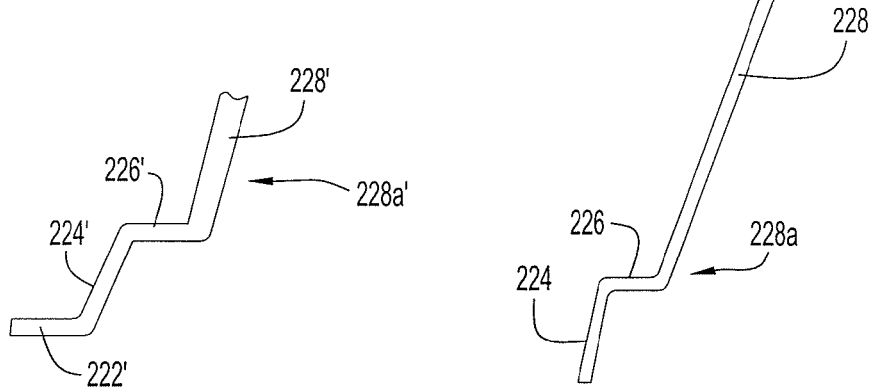
FIG. 4C illustrates a partial side view of the lower end of an alternative embodiment of a support rod.

Referring to FIG. 4C, an alternative embodiment of a support rod is illustrated. In this embodiment, the support rod 228' has a lower end 228a' and an additional rod section as compared to rod 228 which is illustrated in FIGS. 4A and 4B. Support rod lower end 228a' includes rod sections 226', 224', and 222'. Rod section 222' may be rigidly connected to the rear portion 130 of the vehicle 100, or alternatively to the rear section 120a of the central member 120. In either case, the connection between rod section 222' (or the lower end 228a') and the rear portion 130 (or rear section 120a) prevents rotations of the central portion 228'.

Figure 5A:
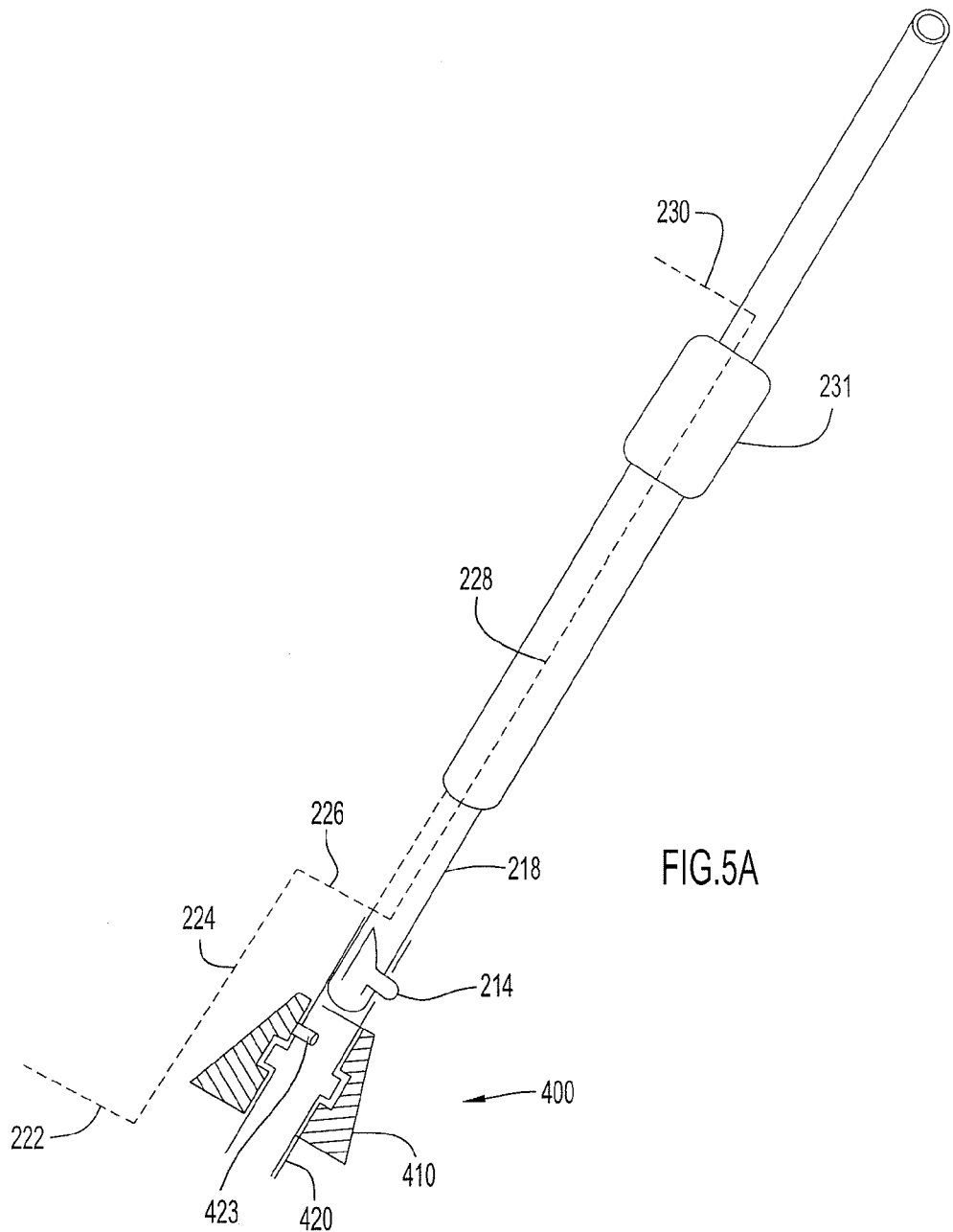
FIG. 5A illustrates a side sectional view of portions of the parent steering mechanism of the ride-on vehicle of FIG. 1.
Figure 5B:
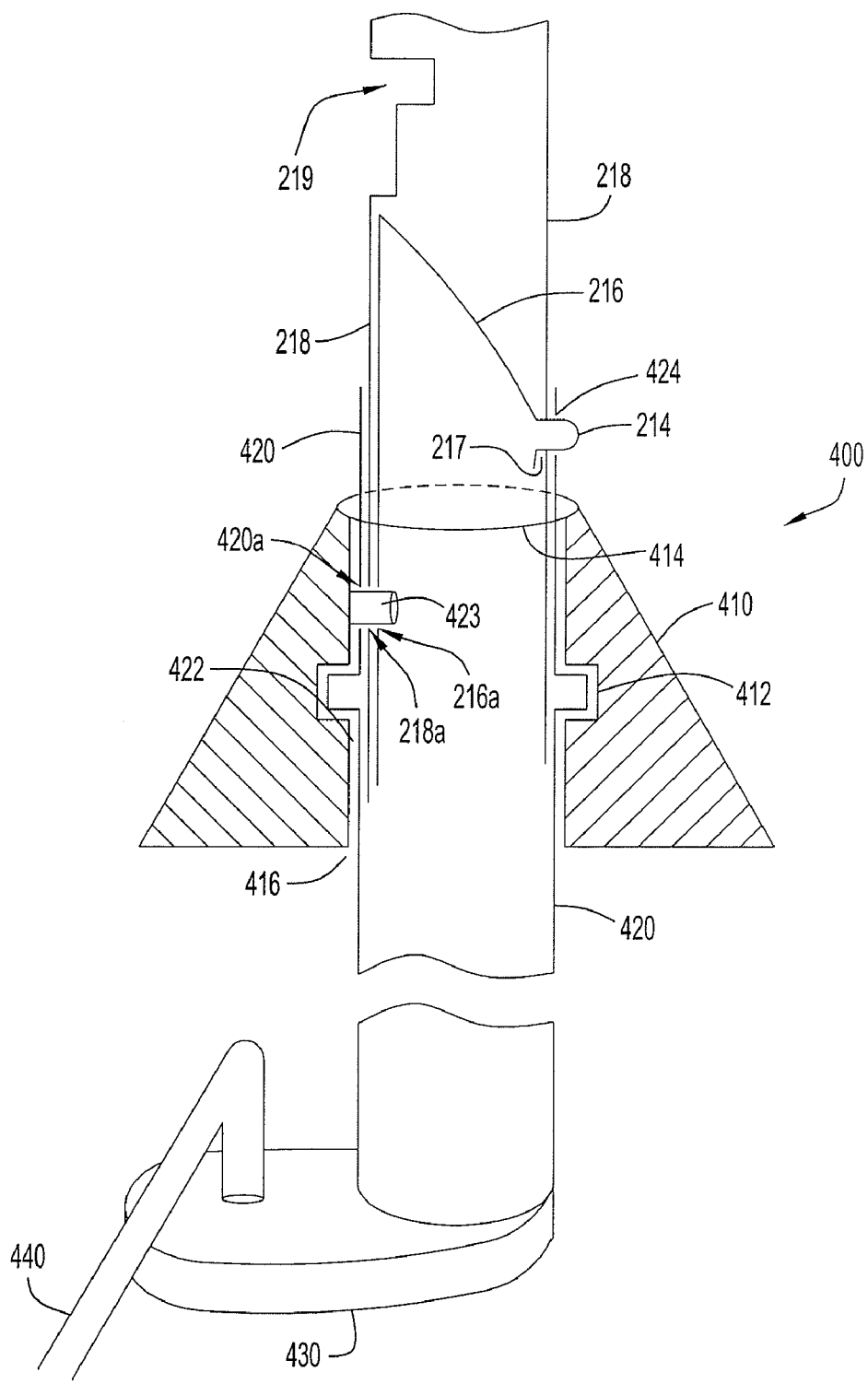
FIG. 5B illustrates an enlarged cross-sectional view a portion of the parent steering mechanism of the ride-on vehicle of FIG. 1.
Figure 5C:
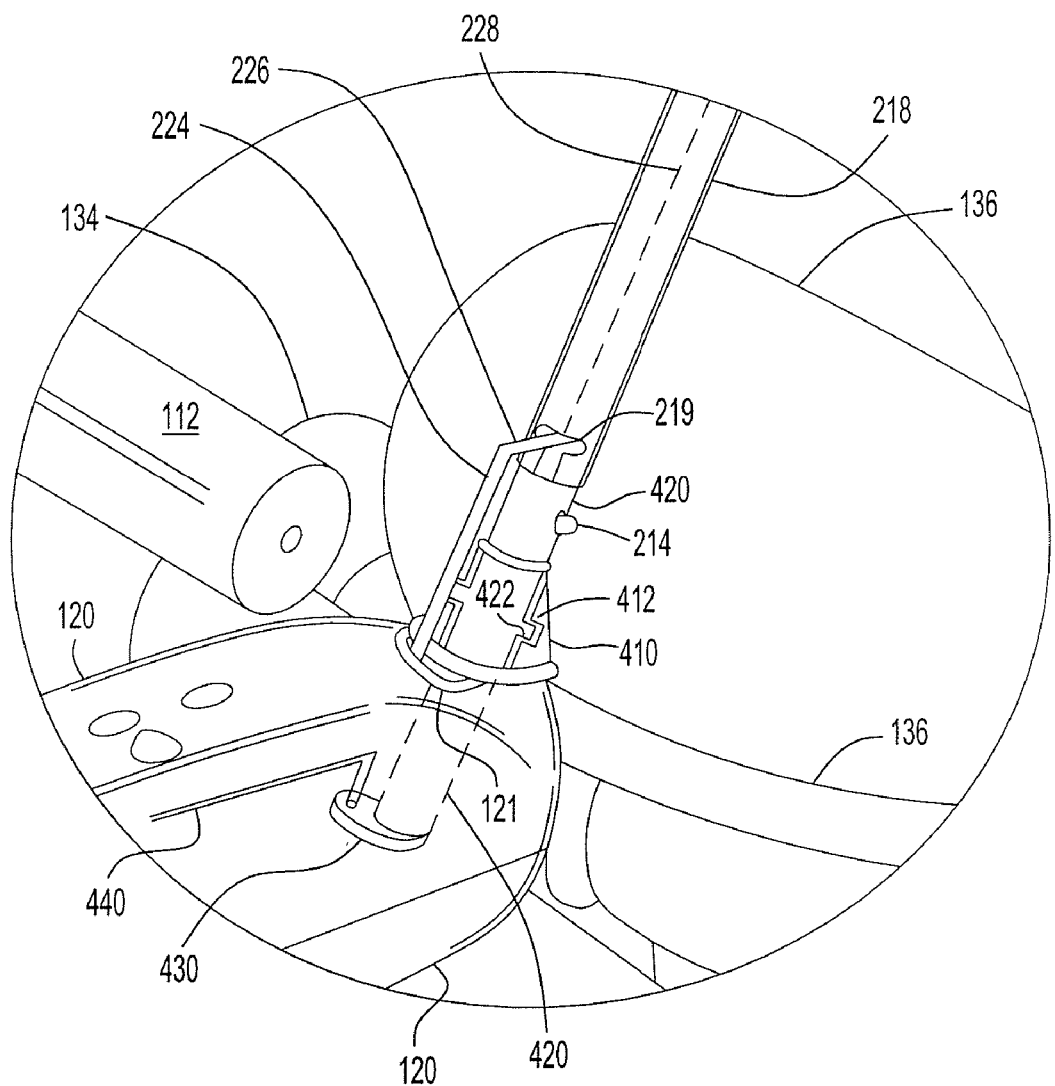
FIG. 5C illustrates an enlarged perspective view of a portion of the parent steering mechanism showing the connection between the elongated member and the rear portion of the ride-on vehicle of FIG. 1, with interiorly disposed portions shown in phantom.

FIGS. 5A, 5B and 5C illustrate an exemplary connection arrangement of the parent steering member 200 to the rear portion 130 of the parent controllable ride-on vehicle 100. A torque shaft 420 extends downwardly and into a correspondingly configured opening in the rear section 120a of the central member 120. As shown in FIG. 5C, portions of the torque shaft 420 that are disposed within an interior chamber of the central member 120 are shown in phantom. The exteriorly disposed end of the torque shaft 420 is coupled to a lower member connector 218, described in further detail below. Attached to the rear section 120a of the central member 120 and at least partially surrounding the torque shaft 420 is a pivot bushing 410. The pivot bushing 410 includes a pivot notch 412. The interiorly disposed section of the torque shaft 420 extends downwardly from the pivot bushing 410 through a lower bushing opening 416. Connected to a central portion of the torque shaft 420 is a pivot bearing 422, which is received in the pivot notch 412 within the pivot bushing 410. The pivot notch 412 and corresponding pivot bearing 422 retain the torque shaft 420 within the pivot bushing 410, while permitting rotation of the torque shaft 420 within the pivot bushing 410 about the longitudinal axis of the torque shaft 420.

As described above, an exteriorly disposed portion of the torque shaft 420 extends above and outwardly from a corresponding upper bushing opening 414 in the pivot bushing 410. Above the pivot bushing 410 the torque shaft 420 includes a shaft opening 424. Extending downwardly from the lower end of the parent steering member 200 is the lower member connector 218. The lower member connector 218 includes a connector opening 217. The lower member connector 218 is sized slightly smaller than an upper opening of the torque shaft 420 to be received in the torque shaft 420 in a snug manner. The lower member connector 218 is received within torque shaft 420 so that shaft opening 424 and connector opening 217 are aligned.

In addition or alternative to the friction fit between the lower member connector 218 and the torque shaft 420, a snap button 214 is preferably provided in the interior of lower member connector 218. The snap button 214 includes a flexible body 216 which is biased outwardly and through the connector opening 217 of the lower member connector 218. As shown in FIGS. 5A, 5B and 5C, when the shaft opening 424 and connector opening 217 are aligned, the snap button 214 extends through both the connector opening 217 as well as the shaft opening 424, thereby releasably securing the lower member connector 218 to the torque shaft 420. The snap button 214 retains the relative position of the lower member connector 218 and the torque shaft 420, thereby restricting sliding and rotational motion of the secured components.

Therefore, when a parent rotates the parent steering member 200 (including the lower member connector 218), the snap button 214 (and/or frictional fit) forces rotation of the torque shaft 420. Rotation of the torque shaft 420 in turn causes rotation of a torque arm 430 disposed at and extending outwardly from a lower end of the torque shaft 420. Rotation of the torque aim 430 either pulls or pushes a force transfer arm 440. The force transfer arm or torque transfer bar 440 extends through the central member 120, and couples the torque arm 430 to the front steering portion 110.

As shown in FIG. 5A, the pivot bushing 410 includes a plastic peg or post 423 extending therefrom inwardly. Referring to FIG. 5B, the peg or post 423 extends through openings 420a, 218a, and 216a that are formed in the torque shaft 420, the connector 218, and the body 216, respectively. The post 423 extends through the aligned openings 420a, 218a, and 216a to ensure that the snap button 214 is properly aligned with openings 217 and 424.

It should be understood that the specific configuration of the lower member connector 218 and the torque shaft 420 illustrated herein is exemplary only. For example, the lower member connector 218 may include a lower end having a non-cylindrical configuration which fits within a correspondingly configured portion of the torque shaft 420. Such a connection may minimize slippage and/or stress on the snap button 214, thereby maximizing torque transfer capability.

The pulling or pushing force imparted to the force transfer arm 440 transfers a force through the central member 120 to the front steering portion 110. A front steering force transfer mechanism (not shown) transforms the force from the force transfer arm 440 into a force that rotates the front steering portion in a corresponding direction as the force applied by the parent to the handle 245 of the parent steering member 200. Any conventional mechanism enabling the force to be transferred from the force transfer arm 440 to the front steering portion 110 may be employed, thereby allowing a parent to co-control the direction of movement of the parent controllable ride-on vehicle 100.

In other embodiments, the torque transfer mechanism between the torque shaft 420 and the front steering portion 110 need not be accomplished by a torque transfer bar 440. Force can be transferred between the front steering portion 110 and the parent steering member by a belt, multiple force transfer rods, gears or some combination of the foregoing.

In other embodiments, the parent steering member 200 may control a rear wheel steering mechanism. The canopy could be mounted to the parent steering member 200 in a relatively stationary manner while the parent steering member 200 is rotated to manipulate the rear steering mechanism of the vehicle 100.

Referring to FIGS. 5B and 5C, the lower member connector 218 may also include a T-shaped opening 219 disposed above the pivot bushing 410 through which rod section 226 extends. Rod section 226 emerges from the T-shaped opening 219 and rod section 224 extends downwardly toward the central member 120. A notch 122 in the central member opening 121 may be used with an embodiment of a rod 221 with a lower rod section 222', preventing rotation thereof. Furthermore, as the parent steering member 200 is rotated for steering, rod section 226 remains relatively stationary given it may be accommodated within various portions of the upper portion of the T-shaped opening 219 or slot. In this way, the rod 221 is partially supported by but not rigidly connected to the parent steering member 200. When the parent steering member 200 is rotated, the rod 221 remains substantially stationary.

In one embodiment, the parent steering member 200 is selectively removable from the parent controllable ride-on vehicle 100. In addition, the lower end of the rod 221 may be removably secured to the central member 120. As such, the parent steering member 200 and canopy 300 may be selectively removable from the vehicle 100. For example, the snap button 214 may be depressed to disengage the lower member connector 218 from the torque shaft 420. When the snap button 214 is depressed completely through the shaft opening 424, the lower end of the lower member connector 218 may be removed from within the upper portion of the torque shaft 420. In addition, the lower end of the rod 221 may be detached from the parent controllable ride-on vehicle 100, thereby detaching the entire parent steering member 200 and the canopy 300 from the parent controllable ride-on vehicle 100.

It is intended that the present invention cover all modifications and variations of this invention provided they come within the scope of the disclosure as well as the appended claims and their equivalents. For example, it is to be understood that terms such as "left," "right," "top," "bottom," "front," "rear," "side," "height," "length," "width," "upper," "lower," "interior," "exterior," "inner," "outer," and the like as may be used herein, merely describe points of reference and do not limit the present invention to any particular orientation or configuration.

What is claimed is:

1. A ride-on vehicle, comprising:
   a frame having a front portion and a rear portion;
   a front wheel coupled to the front portion;
   a parent steering mechanism coupled to the frame and connected to the front wheel for turning the front wheel in a desired direction, the steering mechanism including an elongate member having a lower end coupled to the frame and an upper end, rotation of the elongate member causing rotation of the front wheel; and
   a canopy coupled to the frame via a support member, the support member extending through at least a portion of the elongate member such that the canopy is maintained in a substantially stationary position relative to the frame when the elongate member is rotated relative to the frame.

2. The ride-on vehicle of claim 1, wherein the canopy is located proximate to the upper end of the elongate member.

3. The ride-on vehicle of claim 1, wherein the support member includes a first portion and a second portion, the first portion of the support member being located within the elongate member, and the second portion of the support member being located external of the elongate member.

4. The ride-on vehicle of claim 3, wherein the second portion of the support member extends outwardly from an opening formed in the elongate member.

5. The ride-on vehicle of claim 3, wherein the support member has a lower end, the lower end of the support member being slidably engaged with a slot formed in the frame.

6. The ride-on vehicle of claim 1, wherein at least a portion of the elongate member is tubular, and the elongate member is rotatably coupled to the frame.

7. A ride-on vehicle, comprising:
a frame having a seat portion, a front wheel, and at least one rear wheel;
a steering portion coupled to the frame, the steering portion being located to the rear of the seat portion relative to the frame, the steering portion being connected to the front wheel to control the orientation of the front wheel, the steering portion including an elongate member extending upward from the frame; and
a canopy supported by a support rod, the support rod extending through a portion of the elongate member, turning the elongate member rotates the front wheel, the canopy remaining stationary relative to the frame when the elongate member is turned relative to the frame.

8. The ride-on vehicle of claim 7, wherein the frame includes a central member having a front end and a rear end, the steering portion is coupled to the rear end of the central member, and the support rod engages the rear end of the central member.

9. The ride-on vehicle of claim 7, wherein the elongate member includes an outer member, and the support rod passes through a portion of the outer member.

10. The ride-on vehicle of claim 7, wherein the elongate member includes a handle portion coupled thereto, and rotation of the handle portion turns the elongate member relative to the frame.

11. A ride-on vehicle, comprising:
a frame having a seat portion, a front wheel, and at least one rear wheel;
a steering portion coupled to the frame, the steering portion being located behind the seat portion, the steering portion being connected to the front wheel to control the orientation of the front wheel, the steering portion including an elongate member extending upward from the frame; and
a canopy supported by a rod, the rod being located within at least a portion of the elongate member, wherein turning the elongate member rotates the front wheel, and the canopy remains stationary relative to the frame when the elongate member is turned relative to the frame.

12. The ride-on vehicle of claim 11, wherein the canopy is located proximate to an upper end of the elongate member.

13. The ride-on vehicle of claim 11, wherein the rod includes a first portion and a second portion, the first portion of the rod being located within the elongate member, and the second portion of the rod being located external of the elongate member.

14. The ride-on vehicle of claim 13, wherein the second portion of the rod extends outwardly from an opening formed in the elongate member.

15. The ride-on vehicle of claim 13, wherein the rod has a lower end, the lower end of the rod being slidably engaged with a slot formed in the frame.

16. The ride-on vehicle of claim 11, wherein at least a portion of the elongate member is tubular, and the elongate member is rotatably coupled to the frame.

17. The ride-on vehicle of claim 11, wherein the frame includes a central member having a front end and a rear end, the steering portion is coupled to the rear end of the central member, and the rod engages the rear end of the central member.

18. The ride-on vehicle of claim 11, wherein the elongate member includes an outer member, and the rod passes through a portion of the outer member.

19. The ride-on vehicle of claim 11, wherein the elongate member includes a handle portion coupled thereto, and rotation of the handle portion turns the elongate member relative to the frame.

* * * * *